United States Patent
Cotton et al.

(10) Patent No.: US 6,690,128 B1
(45) Date of Patent: Feb. 10, 2004

(54) DRIVE SYSTEM FOR DOMESTIC APPLIANCES

(75) Inventors: John Cotton, Hampshire (GB); Laura Gowers, Hampshire (GB)

(73) Assignee: Kenwood Marks Limited, Hampshire (GB)

( * ) Notice: Subject to any disclaimer, the term of this patent is extended or adjusted under 35 U.S.C. 154(b) by 0 days.

(21) Appl. No.: 09/937,630

(22) PCT Filed: Mar. 20, 2000

(86) PCT No.: PCT/GB00/01053

§ 371 (c)(1),
(2), (4) Date: Jan. 2, 2002

(87) PCT Pub. No.: WO00/59098

PCT Pub. Date: Oct. 5, 2000

(30) Foreign Application Priority Data

Mar. 26, 1999 (GB) ............................................. 9906926

(51) Int. Cl.[7] ............................. H02P 1/18; H02P 3/08; H02K 7/06; H02K 7/10
(52) U.S. Cl. ..................... 318/246; 318/362; 310/75 R; 310/83
(58) Field of Search ................................ 318/246, 248, 318/362, 366, 369, 378; 310/75 R, 80, 83; 74/63, 410, 421 A

(56) References Cited

U.S. PATENT DOCUMENTS 3,575,621 A * 4/1971 Voland et al. .............. 310/112
3,744,325 A * 7/1973 Brucken ........................ 74/82
4,274,023 A    6/1981 Lamprey
4,325,643 A * 4/1982 Scott et al. .................. 366/200
5,333,517 A * 8/1994 Bryson et al. ............. 74/810.1
5,905,927 A * 5/1999 Inoue et al. ................ 399/167

FOREIGN PATENT DOCUMENTS

EP          0 305 915 B1    3/1999

* cited by examiner

Primary Examiner—Marlon T. Fletcher
(74) Attorney, Agent, or Firm—Martin Fleit; Paul D. Bianco; Fleit Kain Gibbons Gutman Bongini & Bianco P.L.

(57) ABSTRACT

A drive system for a domestic appliance provides inner and outer coaxial drive outlets operative at different speeds and comprises an active limb, which incorporates an electric drive motor and a shaft driven by said motor and coupled to the inner drive outlet to drive it at a selected speed. The system also includes a passive limb which incorporates a rotary component; the two limbs being mounted in fixed relationship to one another. A first speed reduction mechanism couples the shaft to the rotary component of the passive limb and a second speed reduction mechanism couples the said rotary component to the outer drive outlet. Conveniently, the rotary component comprises a further shaft, disposed substantially parallel to the driven shaft of said motor, and both limbs of the system are rigidly mounted to, and supported by, a common framework of support members. Both speed reduction mechanisms are typically belt driven, and may provide identical reductions.

9 Claims, 3 Drawing Sheets

DRIVE SYSTEM FOR DOMESTIC APPLIANCES

FIELD OF THE INVENTION

This invention relates to drive systems for domestic electrical appliances, and especially though not exclusively to such systems for kitchen appliances such as food processors.

BACKGROUND OF THE INVENTION

Drive systems for kitchen appliances are required to fulfill many criteria, which critically influence various aspects of their design and construction and, in many cases, present the need for compromise. For example a single appliance, such as a food processor can be required to perform tasks which dictate the ability to operate with widely varying speed/torque characteristics, and such performance has to be achieved in a reliable and user-friendly manner, without the generation of undue amounts of noise and/or vibration, in a relatively inexpensive appliance of compact dimensions, of which the operating height is of particular concern.

Many drive systems have been adopted in efforts to optimise the overall performance/price/configuration package offered to the consumer, but most have fallen short of the ideal requirements, at least in some respects.

SUMMARY OF THE INVENTION

It is an object of this invention to provide a drive system for a domestic appliance, which system adopts an approach to the basic drive layout which enables at least one of the criteria mentioned above to be addressed from a novel perspective.

According to the invention from one aspect there is provided a drive system for a domestic appliance, the system providing inner and outer coaxial drive outlets operative at different speeds and comprising a first limb, incorporating an electric drive motor and a drive shaft driven by said motor and coupled to said inner drive outlet to drive it at a selected speed, and a second limb including a rotary component, the limbs being disposed and maintained in spatially fixed relationship to one another; a first speed reduction mechanism coupling the drive shaft to the rotary component of the second limb and a second speed reduction mechanism coupling the said rotary component to said outer drive outlet.

Preferably, said rotary component comprises a further shaft disposed substantially parallel to the drive shaft of said motor, whereby both of said first and second speed reduction mechanisms can be directly connected between said shafts, giving positive driving capability and permitting the construction to be dynamically balanced to reduce wear and to control noise and vibration, even when the system is operated under adverse conditions.

Both limbs of the system are preferably rigidly mounted to, and supported by, a common framework of support members to promote robust and smooth operation.

According to the invention from another aspect there is provided a drive system for a domestic appliance, the system comprising a first limb including an electric motor having a drive shaft provided with a coupling intended to provide a first drive outlet operative at a selected speed, and a second limb including a further shaft disposed substantially parallel to the drive shaft and offset therefrom, a first speed reduction mechanism coupling the motor to the further shaft and a second speed reduction mechanism coupling the further shaft to a second drive outlet concentric with the first drive outlet, and wherein rigid mounting means is provided to mount the two shafts in said substantially parallel relationship to one another.

The incorporation of the motor directly into one of the operative limbs advantageously imparts rigidity into the drive system as a whole.

The selected speed can, in accordance with either aspect of the invention, conveniently be the operational speed of the motor, and is typically in the range 10,000 to 20,000 rpm.

Preferably, in accordance with either aspect of the invention, the motor is a series motor of short axial length, measured along the drive shaft, which permits the height of the drive system, and therefore of the appliance as a whole, to be kept acceptably low, with the drive shafts disposed upright.

Preferably, in accordance with either aspect of the invention, the coaxial drives operate respectively at high speed, direct from the motor, for blending purposes, and at a lower speed suitable for food processing.

It is further preferable, as regards either aspect of the invention, that the speed reduction mechanisms comprise respective belt and pulley mechanisms disposed parallel to one another. This provides reliable and cost-effective speed reduction without unduly increasing the axial length, thus the operative height, of the overall system.

Where two belt and pulley mechanisms are employed they can, if desired, be configured to impart identical speed reductions, thus permitting duplicate components to be used; allowing economies of scale to be taken into account and increasing the cost effectiveness of the system.

More preferably still, as regards either aspect of the invention, the speed reduction mechanisms are respectively disposed to either side of the motor in an axial direction, (above and below the motor respectively in operation) thus providing a stable system with good sound and vibration performance.

The system may, in some embodiments, comprise first and second mounting plates, disposed parallel to one another and on opposing sides of (above and below respectively) said motor, in the axial direction. In these circumstances it is preferred that the first and second speed reduction mechanisms are disposed respectively below the second mounting plate and above the first mounting plate.

BRIEF DESCRIPTION OF THE DRAWINGS

In order that the invention may be clearly understood and readily carried into effect, particular embodiments thereof will now be described, by way of example only, with reference to the accompanying drawings, of which.

DETAILED DESCRIPTION OF THE PREFERRED EMBODIMENTS

Figure 1:
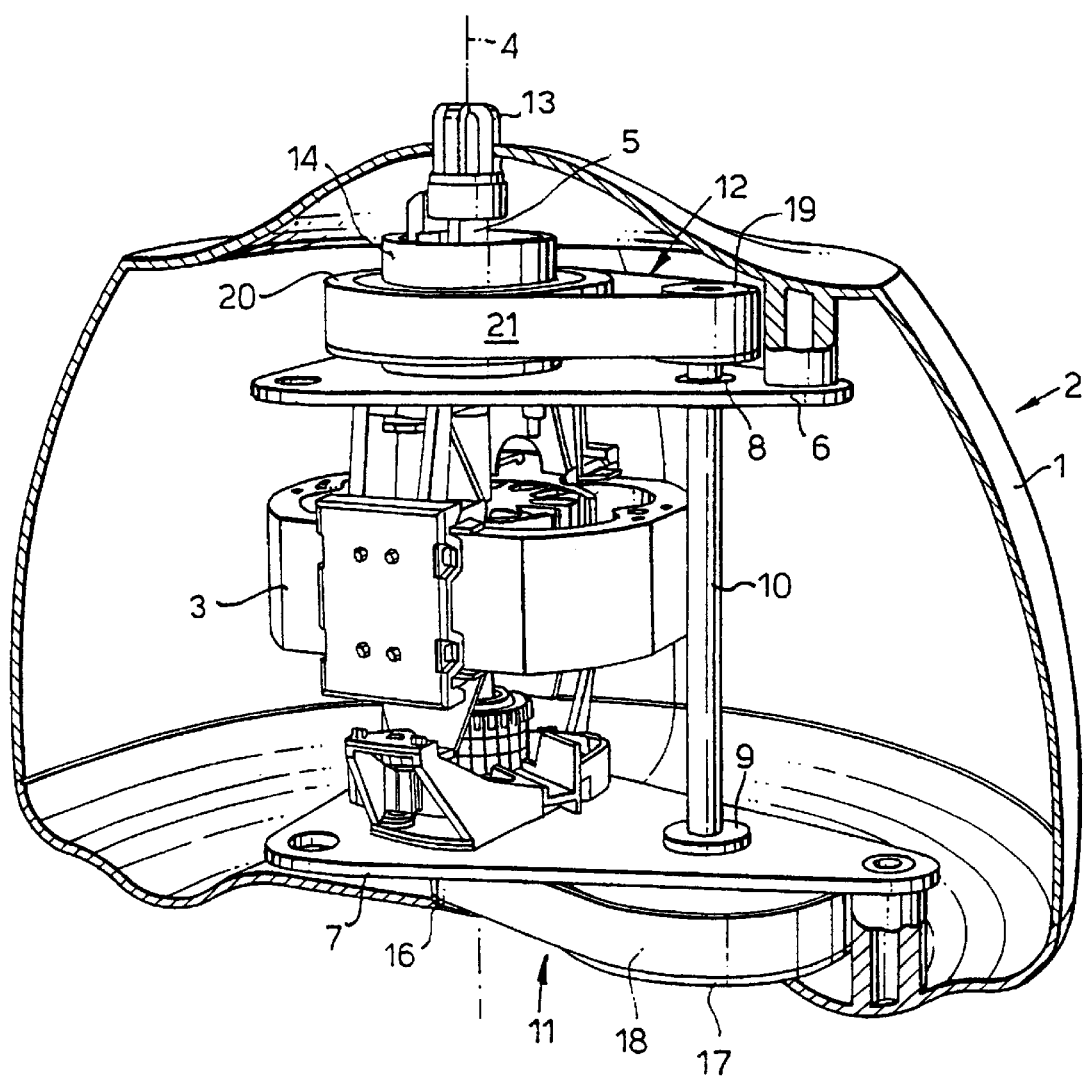
FIG. 1 shows, in perspective view and with the casing partially cut away, a drive system in accordance with one example of the invention and showing a blender drive outlet.

Referring now to FIG. 1, there is shown in part the base casing 1 of a food processor generally indicated at 2. The processor incorporates, within the casing 1, a series motor 3 mounted with its drive axis 4 vertical; the motor having a drive shaft 5 extending both upwardly and downwardly therefrom, along axis 4, and journalled in respective bearings (not shown) carried by upper and lower mounting plates 6, 7.

The motor 3 drives directly by way of its shaft 5 a first drive outlet 13 which constitutes, in this example, a blender drive outlet that operates, of course, at full motor speed. Also journalled in respective bearings, shown schematically at 8 and 9, in the plates 6 and 7 is a second shaft 10, parallel to the drive shaft 5. The shaft 10 is driven, via a first speed reducing drive mechanism 11, by the motor 3 and then itself drives, via a second speed reducing mechanism 12, a relatively low speed drive outlet 14 which is concentric with the drive outlet 13 and is intended to provide, via a detachable bowl drive shaft 15 (see FIG. 2) a food processor drive. This latter drive operates at a speed that is less than the motor speed by an amount determined by the first and second speed reducing drive mechanisms 11 and 12.

In this example, both speed reducing mechanisms comprise belt and pulley systems, and are dimensioned and configured such that each provides a speed reduction of 3.33:1, causing the overall speed reduction as between drive outlets 13 and 14 to be approximately 11:1 though the actual values of reduction used are at the designer's discretion. There is, however, merit in having one speed reducing mechanism duplicate the other, as this permits economies of scale to be made in obtaining pulleys and belts (or other components if different mechanisms are used).

In detail, the speed reducing mechanism 11 comprises a small pulley, part of which is visible at 16 and which is directly mounted to the downward extension of the motor drive shaft 5, a relatively large pulley 17 directly mounted to the shaft 10, and a drive belt 18. Likewise, the second speed reducing mechanism 12 comprises a relatively small pulley 19 directly mounted to the shaft 10, a relatively large pulley 20 directly coupled to the food processor drive outlet 14 and a drive belt 21. As previously indicated, if the speed reductions imparted by the two mechanisms 11 and 12 are to be the same, the smaller pulleys 16, 19; the larger pulleys 17, 20 and the belts 18, 21 respectively can usefully be duplicates.

In this example, and preferably, the speed reducing mechanism 11 is mounted just below the lower mounting plate 7, whereas the speed reducing mechanism 12 is mounted just above the upper mounting plate 6; the plates 6 and 7 being rigidly mounted to the casing 1. By this means, there is provided a rigid assembly comprising parallel drive shafts, or limbs, one of which incorporates the motor 3. This provides natural strength and rigidity in a cost-effective and compact manner, and provides moreover a basic platform or module which is capable with minor modifications of use in various forms of kitchen appliance.

Figure 2:
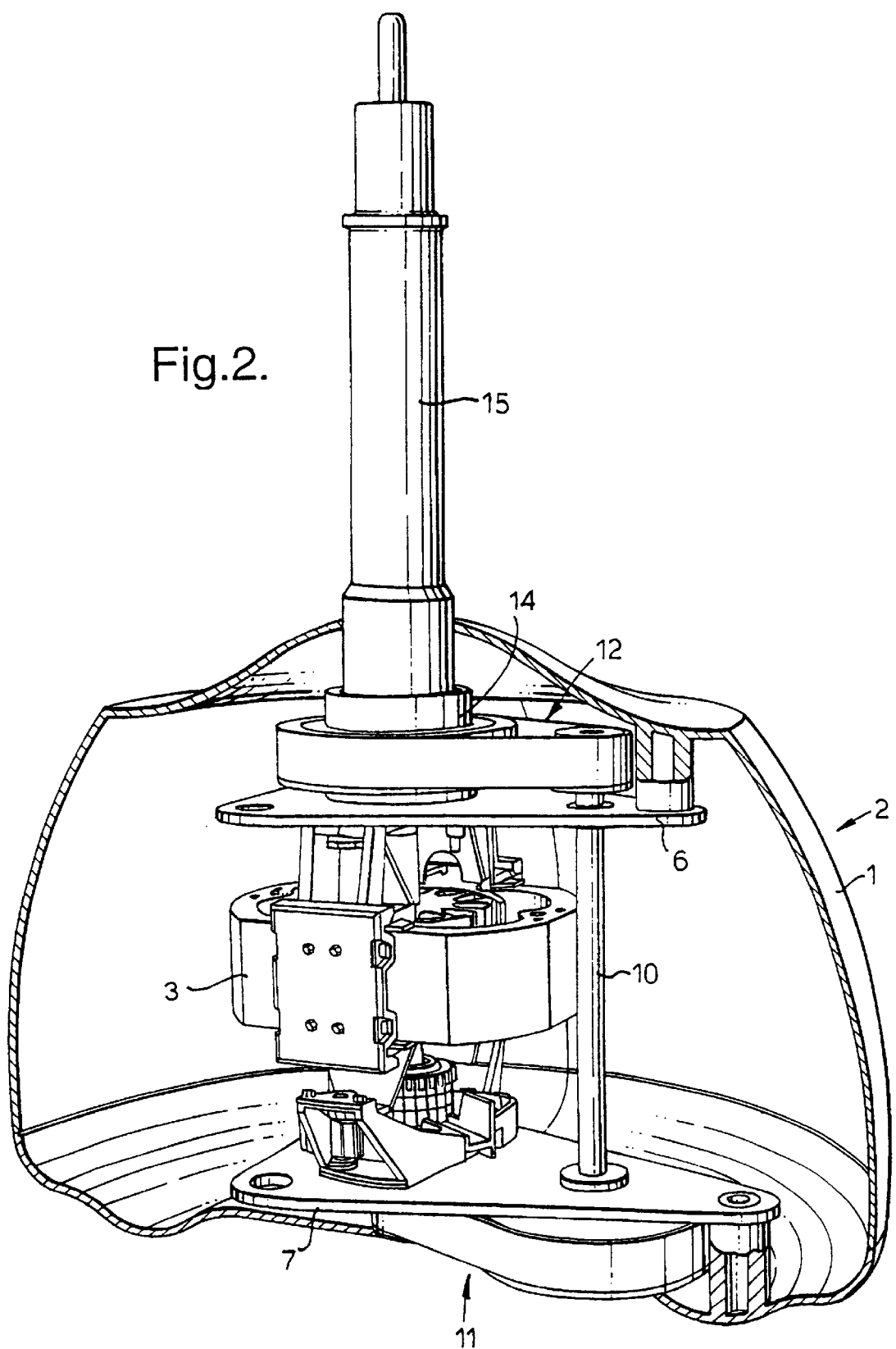
FIG. 2 shows, in similar view to FIG. 1, the system with a food processor drive shaft in place, masking the blender drive outlet.

FIG. 2 is identical to FIG. 1, except that it shows the detachable bowl drive shaft 15 attached to the food processor drive outlet 14.

It will be appreciated that the detailed configuration of the drive system will vary in dependence upon various parameters of the overall appliance design and its operating criteria. For example, instead of using separate upper and lower plates 6 and 7 to achieve the rigid mounting of the motor and the other dynamic components of the system, extensions of the cast motor end frames can be used. Also, although a speed reduction of 11:1 has been referred to in the specific example described above, different ratios can be used, though a reduction in the range of 10:1 to 12:1 is favoured in a system providing blender and food processor drives as described above. Furthermore, the reductions imposed by the two mechanisms 11 and 12 need not be the same.

In one practical example, the centre distance between the shafts 5 and 10 was 81.6 mm, though this is not a critical dimension and variants have been made with the offset as low as 49.0 mm. In the embodiment of the invention to be described with reference to FIG. 3, the offset in current use is 56.55 mm.

Figure 3:
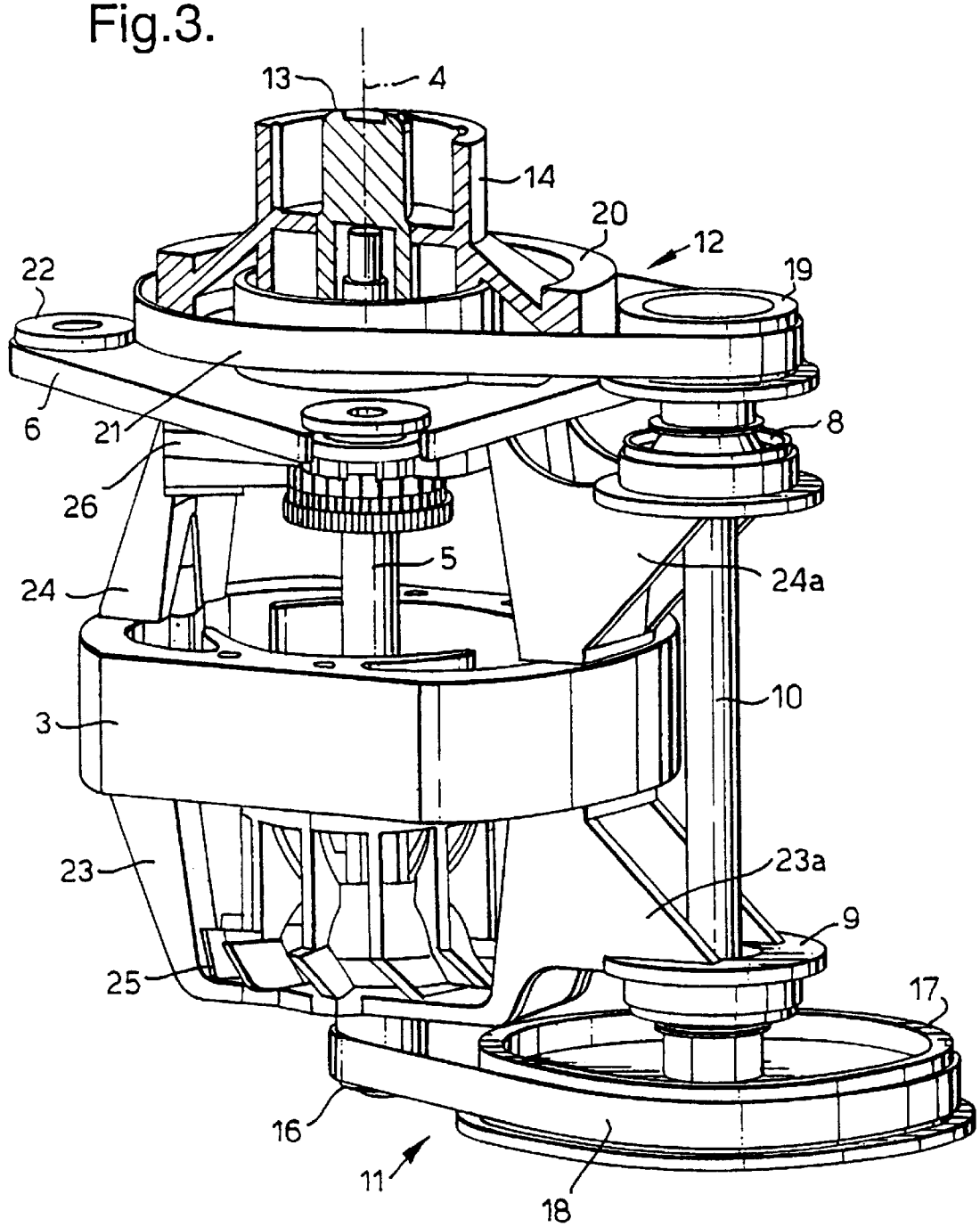
FIG. 3 shows, in similar view to FIG. 1, a drive system in accordance with a second, and preferred, embodiment of the invention.

Referring now to FIG. 3, wherein components common to FIGS. 1 and 2 carry the same reference numbers and will not further be described except insofar as they are differently configured and/or inter-relate to other components, a principal difference from the embodiment shown in FIG. 1 is the omission of the lower mounting plate 7. The components in FIG. 3 are all supported from the upper mounting plate 6 which is suspended, by any convenient fixture components, such as screws (not shown) passing through grommeted apertures such as 22 in the mounting plate 6, from an upper inside surface of a suitable casing (not shown). More sophisticated antivibration mounts than grommets may be utilised for the mounting of the plate 6 if desired. Indeed, active sensors such as piezo-electric washers, may be employed to provide electrical signals indicative of out-of-balance forces such as may be caused by employing the appliance incorporating the drive system of the invention for some inappropriate purpose. The signals from any active sensors employed can be processed appropriately, for example by a microprocessor unit, to generate audible and/or visual warnings, or to automatically shut down the system in response to out-of balance forces in excess of permitted threshold levels.

The drive system is, in this embodiment of the invention, suspended from the plate 6 by way of a common supportive framework comprising lower and upper die-cast, U-shaped end frames 23, 24 which are respectively secured to the lower and upper surfaces of the laminations of the motor 3. Each end frame is formed with a respective girder-like extension 23a, 24a, which extensions provide a rigid mounting for the shaft 10. The end frames 23 and 24 incorporate, as will be appreciated, respective lower and upper bearings for the shafts 5 and 10, and in general constitute a framework that rigidly supports the components of the system and maintains them in their desired spatial relationship. FIG. 3 also shows the blades such as 25 of a cooling fan mounted axially with the motor 3; though it will be appreciated that alternative fan constructions may be used and indeed, in some operating environments, no fan may be needed. A brush board for the motor is shown at 26.

In this embodiment, unlike that of FIGS. 1 and 2, the reductions imparted by the first and second speed reduction mechanisms differ from one another. Here, the pulleys 16 and 17 have 15 and 71 teeth respectively whilst the pulleys 19 and 20 have 27 and 72 teeth respectively. These particular parameters have been found to operate well in the system configuration of FIG. 3 although of course the actual arrangements used may differ in any given embodiment as a result of design, economic and/or functional demands.

In general it will be seen that the invention utilises first and second offset limbs, one active in the sense that it contains the drive motor, and the other passive, in the sense that it is driven only from the active limb; the two limbs being linked by a pair of speed reduction mechanisms to permit coaxial drives to be derived from the active limb.

Although belt-driven drive mechanisms have been shown and described herein, and indeed are preferred from many operational perspectives, other drive mechanisms can be used if preferred, notably those, such as epicyclic gearboxes, that can be configured into a shallow envelope and thus do not compromise the beneficially modest operating height of the system.

Using the drive system described herein as a basic module, it is possible with relatively simple design modifications to change drive ratios and/or drive outlet locations. Moreover, extra drive outlets can be readily incorporated and their desired relative operational speeds readily contrived.

If preferred, moreover, the system can tolerate both speed reducing mechanisms being mounted, in close proximity to one another, adjacent either the upper mounting plate 6 or (if provided) the lower mounting plate 7.

Additional drive outlets can be provided from the system if desired, and motion therefor can be derived from any convenient point in the system. For example, one or more further drives can be taken, directly or indirectly, from the shaft 10 in the passive limb of the system; use being made of known direction-changing mechanisms if necessary to provide any outlet that needs to be out of line with the shaft 10.

While various descriptions of the Present invention are described above, it should be understood that the various features can be used singly or in any combination thereof. Therefore, this invention is not to be limited to only the specifically preferred embodiments depicted herein. Further, it should be understood that variations and modifications within the spirit and scope of the invention may occur to those skilled in the art to which the invention pertains.

Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A drive system for a domestic appliance; the system comprising a base casing containing: an electric drive motor, a first drive shaft driven by said motor, said first drive shaft extending axially of said motor and in both directions therefrom; a second drive shaft offset with respect to said first drive shaft and substantially parallel thereto; a first speed reduction mechanism coupling the first drive shaft to the second drive shaft; a supporting framework configured to dispose and maintain said first and second drive shafts in spatially fixed relationship to one another; said framework including mounting components disposed axially to both sides of said motor for each of said drive shafts; and said mounting components including respective bearings for said first and second drive shafts; the system further including first and second drive outlets upstanding from said casing; said first and second drive outlets being coaxial and configured with one of said drive outlets surrounding the other said drive outlet; and a coupler coupling said first and second drive shafts respectively to said first and second drive outlets to drive said drive outlets in rotation with said first drive outlet being driven at a preselected speed; the coupler further comprising a second speed reduction mechanism coupling said second drive shaft to said second drive outlet.

2. A system according to claim 1 wherein the motor is a series motor of short axial length, measured along the drive shaft.

3. A system according to claim 1 wherein the first drive outlet provides a relatively high speed drive configured to facilitate its use for blending purposes, and the second drive outlet provides a relatively low speed drive configured to facilitate its use for food processing.

4. A system according to claim 1 wherein the speed reduction mechanisms comprise respective belt and pulley mechanisms disposed parallel to one another.

5. A system according to claim 1 wherein the two belt and pulley mechanisms impart identical speed reductions.

6. A system according to claim 1 wherein the speed reduction mechanisms are disposed to either side of the motor in an axial direction relative thereto.

7. A system according to claim 1 comprising first and second mounting plates disposed parallel to one another and on opposing sides of said motor, in an axial direction relative thereto.

8. A system according to claim 7 wherein the first and second speed reduction mechanisms are disposed respectively below the second mounting plate and above the first mounting plate.

9. A drive system according to claim 1 wherein said preselected speed is the operational speed of said motor.

* * * * *